United States Patent
Buchholz et al.

[11] Patent Number: 5,413,741
[45] Date of Patent: May 9, 1995

[54] NESTED PACKING FOR DISTILLATION COLUMN

[75] Inventors: Matthew Buchholz, Wichita, Kans.; Neil Yeoman, Merrick, N.Y.; Frank E. Mattke, Augusta, Kans.

[73] Assignee: Koch Engineering Company, Inc., Wichita, Kans.

[21] Appl. No.: 203,876

[22] Filed: Mar. 1, 1994

Related U.S. Application Data

[63] Continuation of Ser. No. 983,969, Dec. 1, 1992, abandoned.

[51] Int. Cl.⁶ .............................................. B01F 3/04
[52] U.S. Cl. ................................. 261/112.2; 428/183
[58] Field of Search ...................... 428/183; 261/112.2

[56] References Cited

U.S. PATENT DOCUMENTS

| | | |
|---|---|---|
| 3,372,743 | 3/1968 | Pall et al. . |
| 3,542,635 | 11/1970 | Parker ................................ 261/112.2 |
| 3,574,103 | 4/1971 | Latkin .................................... 428/183 |
| 3,887,664 | 6/1975 | Regehr ............................... 261/112.2 |
| 4,296,050 | 10/1981 | Meier . |
| 4,423,772 | 1/1984 | Dahlgren . |
| 4,548,766 | 10/1985 | Kinney, Jr. et al. ............... 261/112.2 |
| 4,668,443 | 5/1987 | Rye ...................................... 261/112.2 |
| 4,710,326 | 12/1987 | Seah ................................... 261/112.2 |
| 4,915,165 | 4/1990 | Dahlgren et al. . |

FOREIGN PATENT DOCUMENTS

| | | | |
|---|---|---|---|
| 1095827 | 2/1981 | Canada ............................. | 261/112.2 |
| 0259062 | 3/1988 | European Pat. Off. . | |
| 1406727 | 6/1965 | France .............................. | 261/112.2 |
| 2195327 | 4/1988 | United Kingdom . | |

*Primary Examiner*—Tim Miles
*Attorney, Agent, or Firm*—Shook, Hardy & Bacon

[57] ABSTRACT

A plurality of corrugated plates are arranged in parallel relationship with corrugations in adjacent plates extending in a criss-crossing pattern to form a packing element for a heat exchange or mass transfer column. The plates are spaced closer together by providing reliefs in adjacent plates at the points of intersection between the criss-crossing corrugations. The reliefs allow the corrugations on the adjacent plates to extend into each other to reduce the spacing between the plates. The reliefs may be in the form of apertures or recesses.

6 Claims, 3 Drawing Sheets

NESTED PACKING FOR DISTILLATION COLUMN

This is a continuation of application Ser. No. 07/983,969, filed on Dec. 1, 1992, now abandoned.

BACKGROUND OF THE INVENTION

This invention relates in general to a column in which mass transfer or heat exchange between liquid and vapor streams occurs and, more particularly, to packing elements used in such columns to facilitate contact between the liquid and vapor streams.

Many types of packings have been developed for use in mass transfer or heat exchange columns. In general, these packings facilitate contact between the liquid and vapor streams by causing more uniform distribution of liquid and vapor over the surface of the packing.

One type of packing that is widely used consists of a plurality of corrugated plates that contact each other and are disposed in parallel relationship to the column axis. Corrugated plates of this type can be constructed of different types of material such as sheet metal and woven wire fabric. When the corrugated plates are made of sheet metal, uniform distribution of the liquid over the plates is impeded because the liquid tends to channel along the fold troughs. To improve liquid distribution over the corrugated plates, it is known to use apertures in the plates so that a portion of the liquid flowing along one side of the plate is deflected to the opposite side of the plate as it encounters an aperture. An example of such a plate is disclosed in U.S. Pat. No. 4,296,050 to Meier.

When corrugated plates are utilized as packing elements, it is generally preferred that the corrugations in one plate extend at an angle to the corrugations in adjacent plates. One problem that results from this criss-crossing orientation is the number of plates that can be packed into a given area with the column is limited by the amplitude of the plate corrugations. As a result, less than the desired plate surface area may be available for facilitating contact between the liquid and vapor streams flowing through the packing elements.

SUMMARY OF THE INVENTION

It is an object of this invention to provide a packing element for a mass transfer or heat exchange column that increases the surface area of contact between liquid and vapor streams so that enhanced mass or heat transfer can occur.

It is another object of this invention to provide a packing element made from individual corrugated plates that are arranged in criss-crossing relationship to achieve the desired liquid and vapor flow patterns and are also nested within each other so that more plates can be placed within a given cross-sectional area of the column to achieve enhanced mass and/or heat transfer between liquid and vapor streams flowing in the column.

It is also an object of this invention to provide a packing element made from criss-crossing corrugated plates that are nested together to achieve close spacing and thus enhanced process efficiency but which also provide open flow channels defined by the corrugations to reduce the pressure drop across the packing element so that greater hydraulic capacity can be achieved.

It is a further object of this invention to provide criss-crossing corrugated plates with relief areas that allow the plates to be more closely spaced together, which relief areas can be manufactured of various sizes and/or shapes to achieve the desired spacing without the expense associated with changing the amplitude of the corrugations.

To accomplish these and other related objects, the invention is directed to a packing element for an exchange column, said packing element comprising:

a plurality of adjacent pairs of plates disposed in generally parallel and contacting relationship, each of said plates having corrugations disposed at an angle to corrugations of an adjacent plate; and reliefs in at least one of each adjacent pair of plates, said reliefs being positioned at each intersection of the corrugations of said at least one plate with the corrugations of the other plate in each said adjacent pair of plates, said reliefs being sized to receive an apex portion of the corrugations on the other plate, whereby said corrugations of said one plate in each adjacent pair of plates extend into the corrugations of the other plate when the apex portion of said corrugations are received within said reliefs.

The reliefs provided in the plates preferably take the form of apertures that also allow liquid and vapor to pass through the plates and thereby enhance liquid and vapor distribution in the packing element. Alternatively, the reliefs may be recesses that are generally imperforate but still operate to disrupt the flow of liquid along the corrugations, with resulting enhancement of the liquid and vapor interaction. The invention is also directed to mass transfer and heat exchange columns employing the packing elements described above.

BRIEF DESCRIPTION OF THE DRAWINGS

In the accompanying drawings which form a part of the specification and are to be read in conjunction therewith and in which like reference numerals are used to indicate like parts in the various views.

DESCRIPTION OF THE PREFERRED EMBODIMENT

Figure 1:
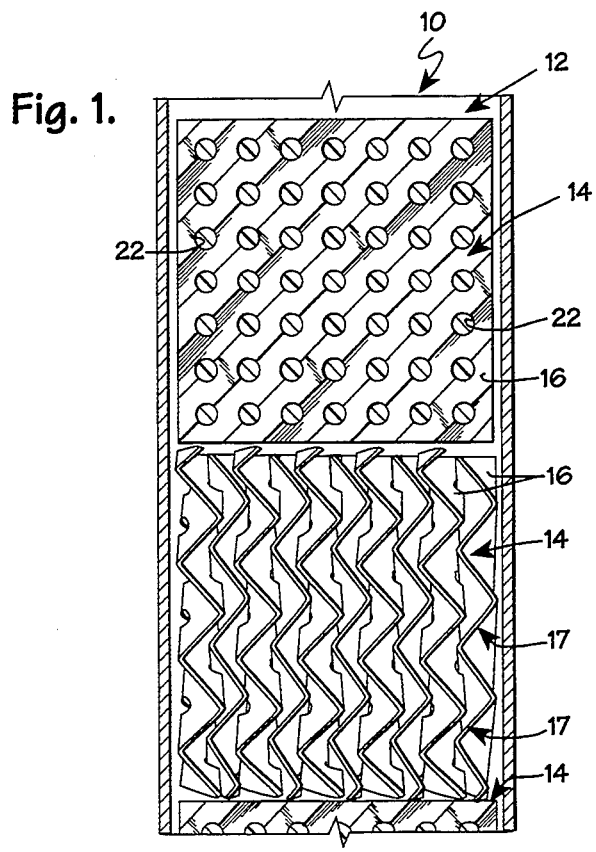
FIG. 1 is a side elevational view of a fragmental portion of an exchange column containing a plurality of packing elements made in accordance with the present invention.
Figure 2:
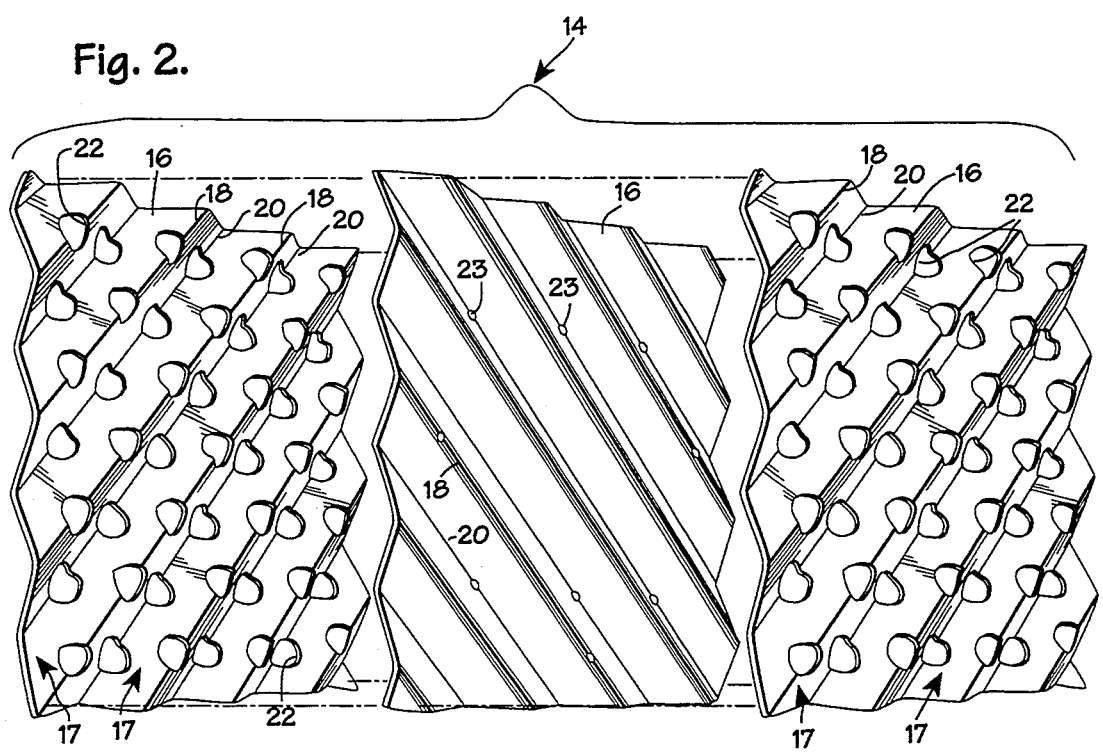
FIG. 2 is an exploded perspective view of one of the packing elements showing the individual corrugated plates which comprise the packing elements.
Figure 3:
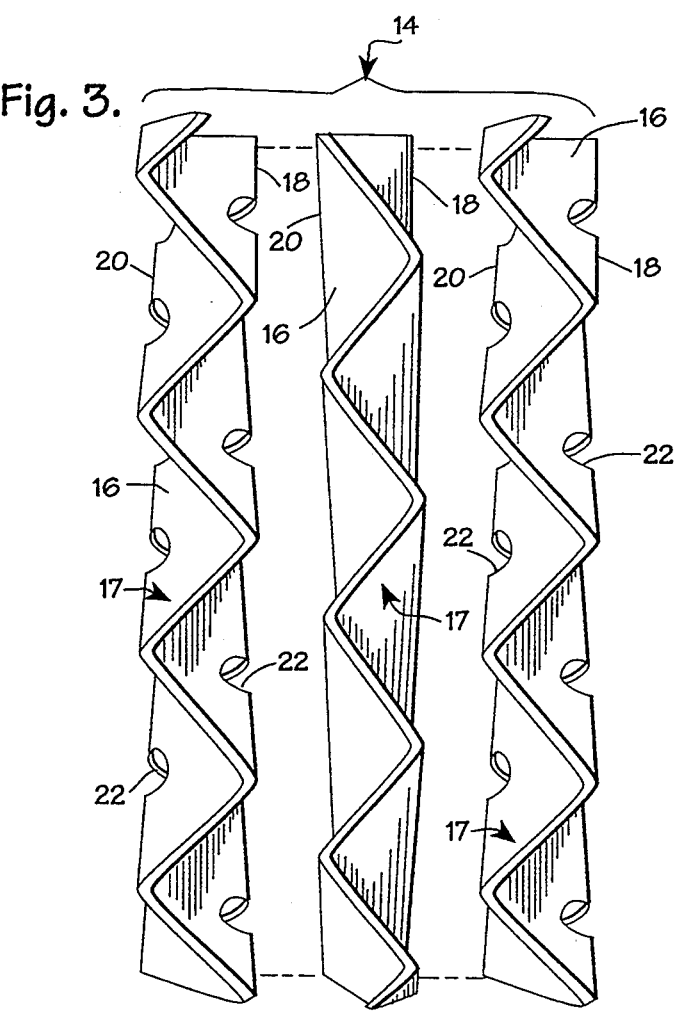
FIG. 3 is an exploded edge elevational view of the packing element illustrated in FIG. 2 but shown on an enlarged scale.

Referring now to the drawings in greater detail, and initially to FIG. 1, the numeral 10 is used to designate a column having a region 12 in which mass transfer and/or heat exchange between liquid and vapor streams occurs. The liquid and vapor streams enter the region 12 from adjacent portions of column 10 and typically flow countercurrent to each other. Column 10 may comprise any suitable size and shape and may include other regions in which additional processing of the liquid and vapor streams takes place.

A plurality of packing elements 14 are housed within column region 12. Each packing element 14 comprises a plurality of contacting and parallel plates 16 that extend upright in generally parallel relationship to the vertical axis of the column 10. The plates 16 have corrugations 17 comprising alternating and parallel ridges 18 and troughs 20 which are formed in any suitable manner, typically by folding a flat sheet of material. The ridges 18 and troughs 20 may be formed with sharp edges, curvilinear edges or other desired configuration. The apex of the ridges 18 on each plate 16 preferably lie in a common flat plane. The troughs 20 on each plate 16 likewise lie in a common plane.

The corrugations 17 in each plate 16 extend at a preselected angle to the corrugations of adjacent plates 16 to form a criss-crossing pattern that facilitates mixing of the liquid and vapor streams. The corrugations 17 in alternating plates may extend in the same direction in overlying or offset relationship, but they need not necessarily do so. Instead, the corrugations 17 in alternate plates may extend at different angles if desired.

The size of the plates 16 may be varied as desired. In some applications, the plates 16 can be sized to extend completely between opposite sides of the column 10. In other applications, two or more packing elements 14 may be positioned side by side across the width of the column 10. The plates 16 may also be of a height to extend from the top to the bottom of region 12 or two or more packing elements 14 may be stacked one on top of the other to fill the region 12. As illustrated, each stacked packing element 14 is disposed at an angle of 90 degrees to the overlying or underlying packing element. It is to be understood, however, that other angles could be utilized if desired.

Turning additionally to FIGS. 2-6, a plurality of plates 16 which form part or all of one of the packing elements 14 are shown. Each of the plates 16 is preferably formed from solid sheet-like material such as various metals or other materials capable of withstanding the conditions to which they are exposed in column 10.

Figure 4:
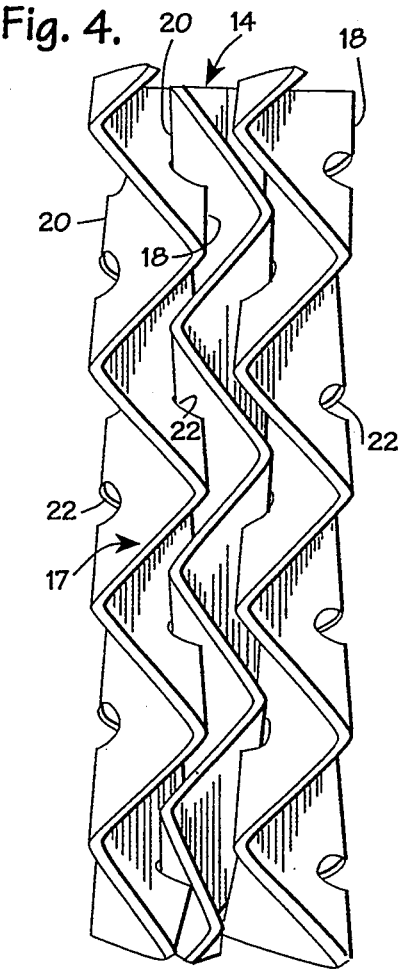
FIG. 4 is an edge elevational view of the packing element and similar to the view shown in FIG. 3 but with the individual plates being nested together.
Figure 5:
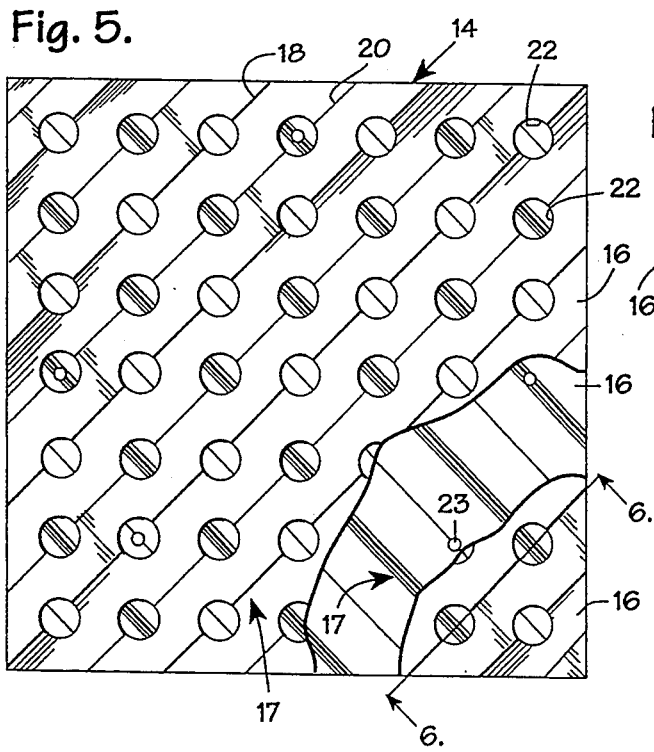
FIG. 5 is an elevational view of the packing element shown in FIG. 4, portions of the packing element being broken away to show the criss-crossing arrangement of the corrugations on adjacent plates of the packing element.
Figure 6:
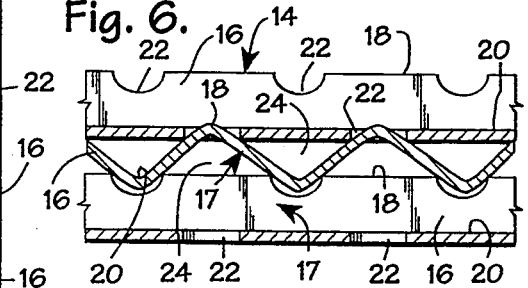
FIG. 6 is an elevational view of the packing element taken in section along line 6—6 of FIG. 5 to shown the liquid and vapor flow channels formed by the plate corrugations.

In accordance with the present invention, some or all of the plates 16 in the packing elements 14 contain reliefs in the form of apertures 22. The apertures 22 are arrayed so that an aperture is located at each intersection of the ridges 18 of one plate 16 with troughs 20 in an adjacent plate 16. This positioning of the apertures 22 at the points of contact between the adjacent plates allows a portion of the corrugations 17 on one plate 16 to extend within the corrugations of an adjacent plate, as is best shown in FIGS. 4 and 6. As a result, the plates 16 can be spaced more closely together than would otherwise be possible if the apertures 22 were not present.

The spacing between plates 16 can be changed by varying the size and shape of the apertures 22 as well as by placing an aperture 22 in both plates 16 at each intersection of corrugations 17 rather than in only one of the adjacent plates. In some applications, close spacing may be desired and can be achieved by increasing the sizing of the apertures 22 without changing the amplitude of the corrugations 17. In other applications, smaller apertures 22 may be used to increase the spacing between the plates 16. The shape of the apertures 22 is not limited to the circular configurations illustrated but can include other configurations as desired.

It can be appreciated that the apertures 22 are particularly advantageous in that they allow the spacing between plates 16 to be varied in a manner other than by changing the amplitude of the corrugations 17. The apertures 22 thus allow plates 16 with corrugations 17 of a given amplitude to be used in many different applications by simply punching different sized and/or shaped apertures 22 in the plates. This can greatly reduce the fabrication costs for the plates 16 by allowing one or more standard corrugation sizes to be utilized in a wide range of applications.

Figure 7:
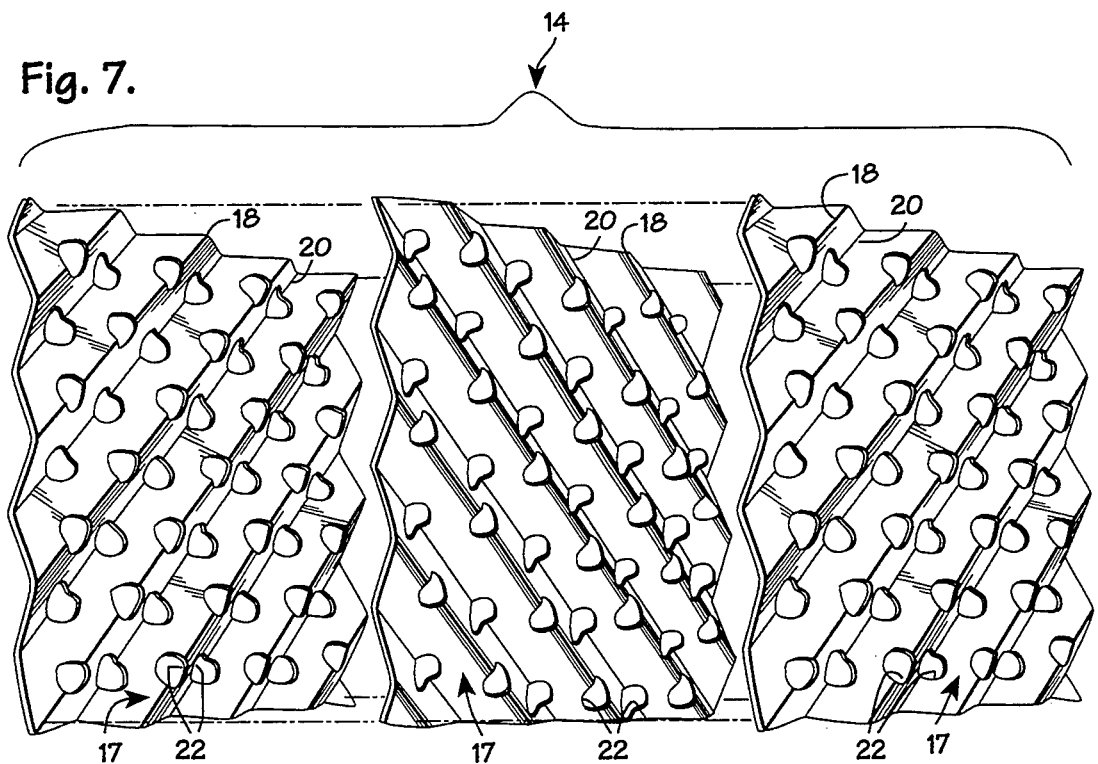
FIG. 7 is an exploded perspective view of a packing element similar to that shown in FIG. 2 but having apertures formed in the middle as well as in the outer plates.

In the illustrated embodiment, all of the apertures 22 at each intersection of corrugations 17 are contained in one plate 16 in each adjacent pair of plates and no apertures 22 are provided in the paired plate. Instead, the paired plate 16 preferably contains a random or ordered arrangement of openings 23 that allow liquid and/or vapor to pass through the plate. It is to be understood, however, that in another embodiment some of the apertures 22 can be formed in one of the plates while others of the apertures 22 are formed in the other plate. In a still further embodiment, apertures 22 can be formed in both plates 16 at some or all intersections of the corrugations 17, as shown in FIG. 7. In such an embodiment, the apertures need not be of the same size or shape. For example, the apertures 22 in one plate can be substantially larger than those in the adjacent plate. This would allow the smaller apertures to be received by the larger apertures and extend beyond the opposite face of the plate 16 into a flow channel formed along the back side of the associated corrugation 17. The presence of the smaller apertures 22 in the flow channel not only disrupts liquid flow along the channel but also directly funnels the liquid through both of the adjacent plates 16, thereby achieving greater positive distribution of liquid between the plates 16.

When all of the apertures 22 are contained in one plate 16, they extend along each ridge 18 and trough 20 at intervals corresponding to the perpendicular distance between adjacent ridges and adjacent troughs. The apertures 22 on successive ridges lie along common imaginary parallel lines that extend at a preselected angle along the plate 16. The orientation of these parallel lines corresponds to the angle along which the corrugations 17 in an adjacent plate lie, as can best be seen in FIG. 5. When the angle to the horizontal formed by the corrugations 17 in the plates is a 45° angle, the apertures 22 form a square grid pattern with apertures equally spaced along the rows and columns of the grid. When other angles are utilized, the grid pattern will assume the shape of a parallelogram.

In use, the plates 16 facilitate distribution and mixing of the liquid and vapor streams flowing through the packing elements 14 in column 10. The apertures 22 allow more plate surface area to be present within each packing element 14 by allowing a greater number of plates 16 to be placed in the packing elements 14. The increased surface area results in better distribution of the liquid and vapor streams and greater contact area between those streams, with the increased contact area serving to facilitate the desired mass transfer and/or heat exchange within the packing elements 14.

In addition to allowing closer spacing between the plates 16 to be achieved, the apertures 22 facilitate liquid distribution through the packing element 14 by allowing the liquid to flow between opposite sides of the plates instead of only along flow channels 24 (FIG. 6) formed by the corrugations 17. Notably, the flow distribution is particularly enhanced when the apertures are sized sufficiently large to allow the corrugations 17 to extend through the apertures and into the flow channel 24 formed along the opposite side of the corrugations 17 containing the apertures 22. The presence of the peak of the corrugation 17 in the flow channel disrupts the laminar flow of liquid along the channel 24, with the resulting turbulence contributing to liquid flow through the apertures 22 as well as down the slopes of the corrugations 17. Notably, when that portion of the peak that extends into the aperture 22 also contains a secondary aperture, liquid enters the secondary aperture and is transferred between the adjacent plates. This results in an enhanced distribution of liquid within the packing element 14.

Despite the nesting together of adjacent plates 16, the flow channels 24 formed by the corrugations 17 remain generally open and reduce the pressure drop across the packing element 14. Remarkably, the flow channels 24 between the nested plates 16 allow the hydraulic capacity of the packing element 14 to be significantly greater than a packing element with the same fixed surface area but having plates with smaller corrugations.

Figure 8:
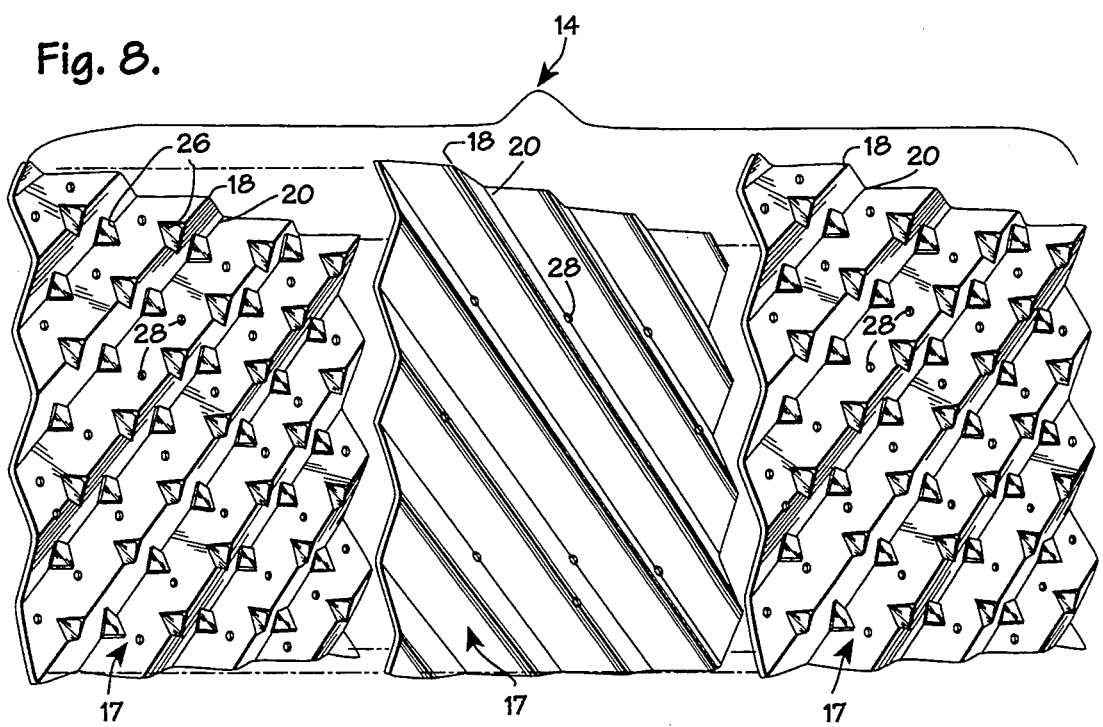
FIG. 8 is an exploded perspective view of a packing element similar to that shown in FIG. 2 but having imperforate recesses spaced along the corrugation ridges and troughs rather than the circular apertures shown in FIG. 2.

While the use of apertures 22 is generally preferred, it is to be understood, however, that the reliefs need not be in the form of apertures 22. Instead, as can be seen in FIG. 8, the reliefs can be imperforate recesses 26 that allow the desired spacing between plates 16 to be obtained. If the recesses 26 are utilized in place of apertures 22, it is preferred that an ordered or random distribution of openings 28 be provided along the corrugations 17 to allow liquid and vapor to pass through the plates 16. These openings 28 can be placed along the slopes of the corrugations 17 as illustrated and/or they can be located along the apex of the ridges 18 and troughs 20.

From the foregoing, it will be seen that this invention is one well adapted to attain all the ends and objects hereinabove set forth together with other advantages which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. In combination with an exchange column, a packing element comprising:

a plurality of adjacent pairs of plates disposed in generally parallel, spaced apart and contacting relationship to define liquid flow channels between the plates to promote distribution of the vapor and liquid streams in the column, each of said plates having corrugations with apex portions, the corrugations of each plate being disposed at an angle to corrugations of an adjacent plate, said plates in each pair of plates having facing sides and opposed sides;

apertures in at least one plate in each adjacent pair of plates, said apertures being positioned at each intersection of the corrugations of the plates in each said adjacent pair of plates, said apertures in said one plate being sized to receive the apex portion of the corrugations of the other plate, whereby said apex portions of the corrugations of the other plate extend through the apertures and beyond the opposed side of the one plate and into the flow channel defined in part by said opposed side of the one plate to impede flow of liquid along said opposed side of the one plate, to provide close spacing of the plates and to provide greater hydraulic capacity for the packing element; and additional apertures positioned in said apex portions of the corrugations of the other plate at locations to extend through the apertures and beyond the opposite face of the one plate and thereby receive a portion of the liquid flowing along said opposed side of the one plate and to transfer the liquid through the plates and to the flow channel defined in part by the opposed side of the other plate and to enhance distribution of the liquid in the packing element.

2. The packing element in combination with the exchange column as set forth in claim 1, wherein said additional apertures are smaller in size than said apertures.

3. The packing element in combination with the exchange column as set forth in claim 1, wherein said apertures are circular in configuration.

4. The packing element in combination with the exchange column as set forth in claim 1, wherein said plurality of plates are formed from solid sheet-like material.

5. The packing element in combination with the exchange column as set forth in claim 4, wherein said apertures are formed in both plates in each pair of adjacent plates.

6. The packing element in combination with the exchange column as set forth in claim 4, wherein the apertures at each intersection of corrugations are formed in only one of said adjacent pair of plates.

* * * * *